Patented Dec. 15, 1942

2,305,083

UNITED STATES PATENT OFFICE

2,305,083

AMINO ALCOHOL ESTERS

David Walker Jayne, Jr., Old Greenwich, and Harold Milton Day, Cos Cob, Conn., assignors to American Cyanamid Company, New York, N. Y., a corporation of Maine No Drawing. Application March 22, 1940, Serial No. 325,394

11 Claims. (Cl. 260—401)

The present invention relates to the fatty acid esters of sulfonic acid salts of primary amino alcohols and to a process of preparing them.

The ordinary methods of producing carboxylic acid esters of amino alcohols having at least one primary or secondary amino group frequently do not run smoothly and particularly when the carboxylic acid employed is a high-boiling or a long-chain fatty acid. For example, if an amino alcohol such as a mono- or di-ethanolamine is heated with a fatty acid, the ethanolamide of the fatty acid rather than the amino ethylester results. Some of these difficulties have been overcome in the past by employing amino alcohol salts of relatively strong acids. This type salt, however, is not at all suitable for the preparation of the esters of fatty acids and particularly the high boiling fatty acids. When the amino alcohol is used in the form of a salt of a mineral acid or a relatively strong carboxylic acid, it is not compatible with the higher fatty acid or it produces a volatile acid on heating. For example, a fatty acid such as myristic acid and a mono- or di-ethanolamine hydrochloride, sulfate, phosphate, etc. are not compatible and attempts to prepare esters by direct heating of such a mixture or refluxing in an organic solvent, with esterification catalysts, are not successful due to this extreme incompatibility. When myristic acid and a mono- or di-ethanolamine acetate are heated together, the acetic acid is driven off and the amide of myristic acid is formed instead of the ester.

In accordance with the present invention we have found a process in which sulfonic acid salts of amino alcohols having at least one primary or secondary amino group are reacted with carboxylic acids to produce the esters thereof. The reaction proceeds smoothly between either the aliphatic sulfonic acid salts or aromatic sulfonic acid salts of such amino alcohols with fatty acids. In the preferred embodiment of the present invention, however, the aromatic sulfonic acid salts of straight chain primary amino alcohols are reacted with higher fatty acids. These preferred compounds are entirely compatible and the esters are produced by heating mixtures of the substances to about 200–250° C. whereupon water is split out and the fatty acid ester of the aromatic sulfonic acid salt of the amino alcohol is formed. For example, if a mixture of 30 grams of the p-toluene sulfonic acid salt of mono-ethanolamine and 30 grams of myristic acid (1:1 molar ratio) is heated in an open beaker to 250° C. A light brown soft waxy material is obtained which is completely soluble in water, to give "soapy" solutions which have wetting-out, emulsifying, and dispersing properties.

While the compounds of the present invention are most probably esters we do not desire to limit the invention by such a positive designation and prefer therefore to broadly include any or all products produced by the reaction of either aliphatic or aromatic sulfonic acid salts of amino alcohols having at least one primary or secondary amino group with fatty acids. The preferred fatty acids are those containing at least 8 carbon atoms and especially the fatty acids of animal and vegetable origin which contain at least 10 carbon atoms. The fatty acids may be either saturated or unsaturated and may or may not be hydroxylated.

The reaction products of the sulfonic acid salts of amino alcohols and the higher fatty acids of the present invention are useful as wetting agents, detergents, emulsifying agents, dispersing agents and flotation reagents, particularly as promoters in the flotation of acidic silicious gangue. Many of the compounds are soluble in the common aliphatic and aromatic hydrocarbons which very greatly increases their usefulness.

The fatty acid esters of the sulfonic acid salts of amino alcohols of the present invention may also be utilized for the production of fatty acid esters of amino alcohols, by treatment of the ester salts with a suitable alkali. The fatty acid esters so produced are free from contamination with amides and many of the difficulties of the prior methods are eliminated.

The following examples are further illustrations of the present invention, but the invention is not restricted thereby. The parts are given by weight.

EXAMPLE 1

*Reaction product of capric acid and monoethanolamine p-toluene sulfonate*

125 parts of p-toluene sulfonic acid.H$_2$O was added to 40 parts of monoethanolamine. To the resulting salt was added 108 parts of technical capric acid and the mix heated slowly to 250° C., with evolution of steam, and then cooled to room temperature. The product was a thick, dark colored paste which was completely soluble in water.

EXAMPLE 2

*Reaction product of lauric acid and monoethanolamine p-toluene sulfonate*

The same procedure was followed as in Example 1 using 25 parts of p-toluene sulfonic acid.H$_2$O, 8 parts of monoethanolamine and 26 parts of technical lauric acid. The product was a thick, dark-brown paste which was completely soluble in water.

EXAMPLE 3

*Reaction product of myristic acid and monoethanolamine p-toluene sulfonate*

The same procedure was used as described in

Example 1 using 25 parts of p-toluene sulfonic acid.$H_2O$, 8 parts of monoethanolamine and 30 parts of technical myristic acid. The product was a light brown, soft wax which was completely soluble in water.

EXAMPLE 4

*Reaction product of coconut oil fatty acids and monoethanolamine p-toluene sulfonate*

The same procedure was followed as in Example 1 using 50 parts of p-toluene sulfonic acid.$H_2O$, 16 parts of ethanolamine and 54 parts of coconut oil fatty acids. The product was a thick, dark-colored paste which was completely soluble in water.

EXAMPLE 5

*Reaction product of capric acid and monoethanolamine benzene sulfonate*

The same method as employed in Example 1 was used, and 61 parts of benzene sulfonic acid, 23 parts of monoethanolamine, and 65 parts of technical capric acid were reacted together. The product was a dark brown, viscous liquid which was completely soluble in water.

EXAMPLE 6

*Reaction product of capric acid and diethanolamine p-toluene sulfonate*

A process similar to that employed in Example 1 was used and the reaction carried out with 100 parts of p-toluene sulfonic acid.$H_2O$, 50 parts of diethanolamine and 190 parts of technical capric acid (molecular ratio 1:1:2). The product was a water soluble, dark-colored viscous liquid.

Other carboxylic acids which may be used in place of all or part of the acids in the above examples are caproic, palmitic, stearic, oleic, abietic, montanic, napthenic acids, talloil acids, mixtures of such acids and especially mixtures of acids obtainable by saponification from coconut oil, palm kernel oil, cotton seed oil or from any of the various other vegetable or animal oils and fats.

Likewise various other organic sulfonic acid salts of amino alcohols having at least one primary or secondary amino group may be used in place of all or part of those in the above examples and the invention is not limited to those of a particular series. Thus, for example, in addition to the common aromatic sulfonic acids of the benzene series employed in the examples those of diphenyl, napthalene, anthracene, phenanthrene series may be used. The aliphatic sulfonic acids may likewise be employed such as those of paraffin hydrocarbons of 12–18 carbon atoms in length, ligninsulfonic acid, guanyl urea sulfonic acid, dodecyl sulfonic acid and the like, also compounds such as toluene thiosulfonic acid.

Representative amino alcohols which may be employed in preparing the organic sulfonic acid salts in addition to those of the above examples and which may be used in place of all or part thereof are: monopropanol amine, dipropanol amine, mono isopropanol amine, diisopropanol amine, monobutanol amine, mono isobutanol amine, and various other alkyl amino alcohols such as:

2 methyl 2 hydroxy 1 amino propane
2 methyl 2 hydroxy 4 amino butane
2 methyl 2 hydroxy 5 amino pentane
2 methyl 2 hydroxy 6 amino hexane
Hydroxyethyl ethylene diamine
2 amino 1 butanol
2 amino 2 methyl 1 propanol
2 amino 2 methyl 1,3 propanediol
2 amino 2 ethyl 1,3 propanediol
Tri(hydroxy methyl) amino methane or any amino alcohol or derivative thereof having at least one primary or secondary amino group capable of forming a salt with an organic sulfonic acid and at least one hydroxy group capable of forming an ester with a carboxylic acid.

We claim:

1. A process of producing chemical compounds which comprises reacting at elevated temperatures organic sulfonic acid salts of amino alcohols having at least one member of the group consisting of primary and secondary amino groups and having at least one free hydroxy group with higher fatty acids.

2. A process of producing chemical compounds which comprises reacting at elevated temperatures aromatic sulfonic acid salts of amino alcohols having at least one member of the group consisting of primary and secondary amino groups and having at least one free hydroxy group with fatty acids having at least 8 carbon atoms.

3. The higher fatty acid esters of organic sulfonic acid salts of amino alcohols having at least one of the radicals of the group consisting of primary amino radicals and secondary amino radicals.

4. Higher fatty acid esters of organic sulfonic acid salts of amino alcohols having at least one primary amino group.

5. Higher fatty acid esters of organic sulfonic acid salts of amino alcohols having at least one secondary amino group.

6. Higher fatty acid esters of aromatic sulfonic acid salts of amino alcohols having at least one of the radicals of the group consisting of primary amino radicals and secondary amino radicals.

7. Higher fatty acid esters of aromatic sulfonic acid salts of amino alcohols having a primary amino group.

8. Higher fatty acid esters of aromatic sulfonic acid salts of amino alcohols having a secondary amino group.

9. Higher fatty acid esters of p-toluene sulfonic acid salts of amino alcohols having at least one of the radicals of the group consisting of primary amino radicals and secondary amino radicals.

10. Higher fatty acid esters of p-toluene sulfonic acid salts of amino alcohols having a primary amino group.

11. Higher fatty acid esters of p-toluene sulfonic acid salts of amino alcohols having a secondary amino group.

DAVID WALKER JAYNE, JR.
HAROLD MILTON DAY.